M. M. STEVENS & T. J. NEWCOME.
ELECTRIC CUT-OFF MECHANISM.
APPLICATION FILED DEC. 14, 1915.
1,213,705.
Patented Jan. 23, 1917.
2 SHEETS—SHEET 1.
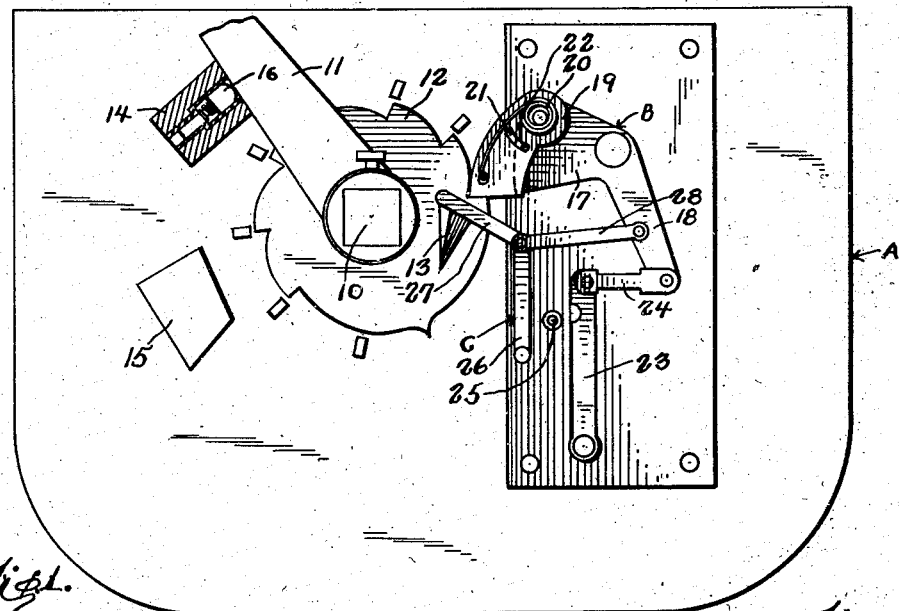

M. M. STEVENS & T. J. NEWCOME.
ELECTRIC CUT-OFF MECHANISM.
APPLICATION FILED DEC. 14, 1915.

1,213,705.

Patented Jan. 23, 1917.
2 SHEETS—SHEET 2.

Witnesses
H. F. Costello
Henry T. Bright

Inventors
M. M. Stevens
T. J. Newcome
By Chandler & Chandler
Attorneys

UNITED STATES PATENT OFFICE.

MINOT M. STEVENS AND THOMAS J. NEWCOME, OF HASTINGS, PENNSYLVANIA.

ELECTRIC CUT-OFF MECHANISM.

1,213,705.   Specification of Letters Patent.   Patented Jan. 23, 1917.

Application filed December 14, 1915. Serial No. 66,865.

*To all whom it may concern:*

Be it known that we, MINOT M. STEVENS and THOMAS J. NEWCOME, citizens of the United States, residing at Hastings, in the county of Cambria, State of Pennsylvania, have invented certain new and useful Improvements in Electric Cut-Off Mechanisms; and we do hereby declare the following to be a full, clear, and exact description of the invention, such as will enable others skilled in the art to which it appertains, to make and use the same.

Our invention relates to electric cut out mechanisms.

It is our purpose to provide a cut out mechanism for use in connection with an electric controller embodying a plurality of contacts and which will operate upon the initial off movement of the controller to cut out the power circuit or the main circuit and thereby "deaden" the contacts of the controller so that the contacts will be saved materially from deterioration and the danger of short circuits in the controller and burning of operator and material eliminated.

We will describe the mechanism in the best form known to us at present and as applied to the controller of an electric car but it will be understood that its adaptation is in no way limited to a controller of this type and that it can be utilized in connection with compensators or any switch devices where it is desired to cut out or deaden contacts of the same before throwing the parts to off position.

Figure 3:
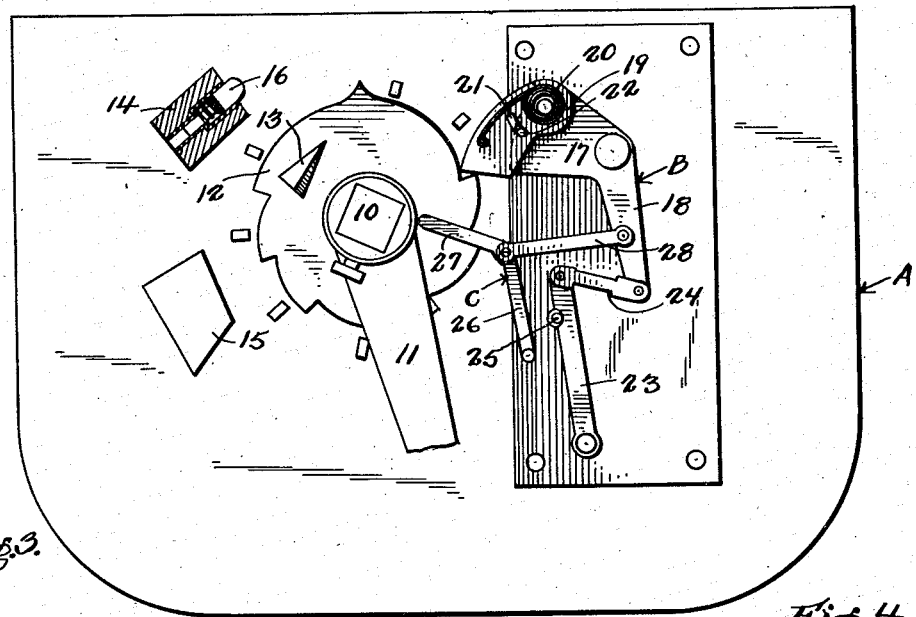
Figure 4:
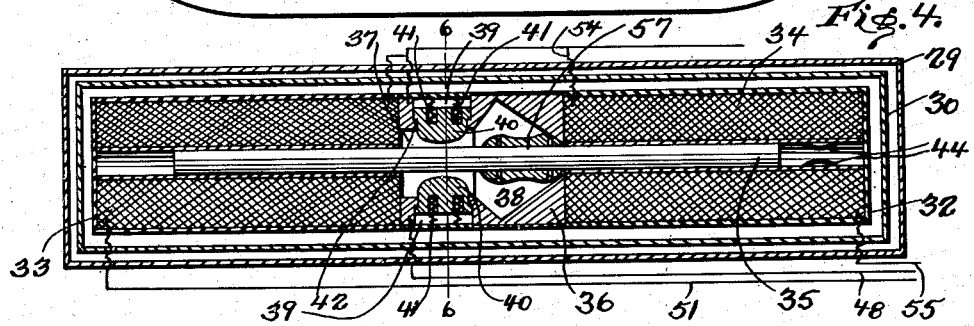
Figure 6:
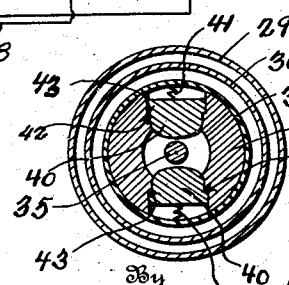

In the drawings chosen to illustrate our invention and wherein like characters of reference denote corresponding parts in the several views Figure 1 is a top plan view of a six point controller embodied in our invention, the parts being in the position they would occupy when the controller is off; Fig. 2, a longitudinal section of the cut out mechanism embodied in our invention, the position of the parts corresponding to the status of the controller shown in Fig. 1; Fig. 3, a view similar to Fig. 1 with the parts in the position they would occupy when the controller is on and initial off movement has been imparted to the controller handle; Fig. 4, a longitudinal section of the cut out mechanism the position of the part corresponding to the status of the controller shown in Fig. 1; Fig. 5, a section on the line 5—5 of 2; Fig. 6, a section on the line 6—6 of Fig. 4; Fig. 7, a diagrammatic view of the wiring embodied in the mechanism, the status being that shown in Figs. 1 and 2, and Fig. 8, a diagrammatic view of the wiring embodied in the mechanism, the status being that shown in Figs. 3 and 4.

Referring to the drawings A indicates generally a six point controller of the type usually employed on electric cars. This controller A includes a controller shaft 10 upon which is fixed a controller handle 11 and a ratchet wheel 12, the latter carrying on its upper side a lug 13 for a purpose that will presently appear. The on movement of the handle 11 is limited by a stop 15, while the off movement of said handle is limited by a stop 14. Carried by the stop 14 and insulated from the latter is a spring pressed contact 16 which engages the handle 11 when the latter is in off position. Pivotally mounted on the body of the controller is a lever B embodying arms 17 and 18. Pivoted on the arm 17 is a pawl 19 which coöperates with the teeth of the ratchet wheel 12 as will be obvious. The pawl 19 is normally held in engagement with the teeth of the ratchet wheel through the medium of a spring 20. This pawl 19 is provided with an arcuate slot 21 having the pivot of the pawl as a center. Engaged in this slot 21 is a stud or pin 22 carried by the arm 17, said stud by engagement with one end of the slot 21 serving to limit the movement of the pawl 19 in one direction under certain conditions that will hereinafter appear. The slot 21 is so positioned that the pawl 19 is free to ride over the teeth of the ratchet wheel 12 during on movement of the latter. Also pivotally mounted on the body of the controller A is a switch 23 the free end of which is connected by a link 24 with the free end of the arm 18. This switch 23 under certain conditions is adapted to make contact with a terminal 25 mounted on the controller. Also pivoted on the body of the controller is an angle lever C including an inner arm 26 and an outer arm 27, the latter extending over the ratchet wheel 12 and into the path of movement of the lug 13. A link 28 has one end pivotally connected to the lever C at the junction of the arms 26 and 27 and its other end pivotally connected to the arm 18 of the lever B. From this construction it will be obvious that as on movement is imparted to the handle 11 and ratchet wheel 12 the pawl 19 will simply ride over the teeth of the ratchet wheel and the other parts previously described will remain in the position shown in Fig. 1. On the other hand when off movement is imparted to the ratchet wheel 12 a tooth of said wheel will interlock with the pawl 19 and as said pawl cannot pivot owing to engagement of the stud 22 with the wall of the slot 21 the lever B will be rocked to the position shown in Fig. 3 and this movement of said lever will in turn move the switch 23 in contact with the terminal 25. Continued off movement of the ratchet wheel 12 will disengage the latter from the pawl 19 and just before the handle 11 reaches its full off position the lug 13 will engage the arm 27 and rock the lever C. This movement of said lever C will operate through the link 28 to rock the lever B and restore the parts to the position shown in Fig. 1.

Our cut out mechanism further embodies a magnetically operated circuit breaker which comprises an outer casing 29 and an inner casing 30 spaced from the outer casing and of course suitably insulated therefrom. Mounted within the inner casing is a frame 32 which supports alined solenoids 33 and 34 having a common core 35. The adjacent ends of the solenoids 33 and 34 are spaced from each other and supported by the frame 32. Between the adjacent ends of said solenoid is a tubular member 36 having a minor bore portion 37 and a major bore portion 38. The wall of the minor bore portion 37 of the member 36 is provided with opposite recesses 39 in which respectively are slidably mounted contacts 40 which are constantly urged inwardly or toward each other by springs 41. Movement of each contact 40 under the influence of the related springs 41 is limited by a shoulder 42 on the wall of the related recess 39 which is engaged by a corresponding shoulder 43. The bore of the solenoid 34 has mounted therein buffer springs 44. These springs are engaged by the core 35 during movement of the latter into the solenoid 34 and serve to absorb shock and jar incident to such movement.

Figure 8:
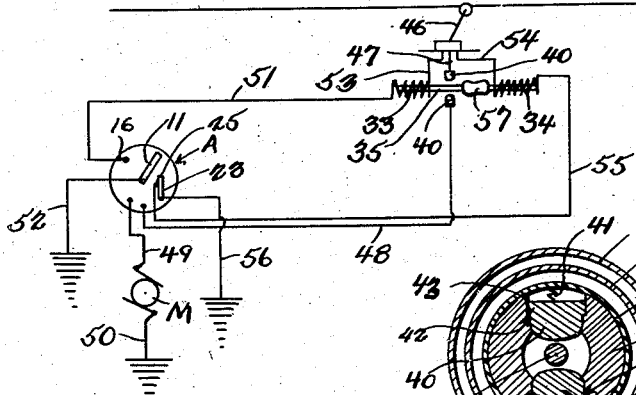

In order that the wiring of the mechanism may be clearly understood we will refer to Figs. 7 and 8 wherein the trolley wire is indicated at 45 and the trolley at 46. The trolley 46 is connected to one of the contacts 40 by a wire 47, while the other contact 40 is connected to the controller A by a wire 48 and said controller is in turn connected to the motor M by a wire 49, said motor being suitably grounded through a wire 50. The solenoid 33 is connected to the contact 16 by a wire 51, and the handle 11 is grounded by a wire 52. Connection between the solenoid 33 and the trolley 46 is effected by a wire 53. The solenoid 34 is connected to the trolley 46 by a wire 54 and with the terminal 25 by a wire 55. The switch 23 is grounded by a wire 56.

Upon reference to Fig. 7 it will be obvious that when the handle 11 is in full off position a circuit will be established through the trolley 46, wire 53, solenoid 33, wire 51, contact 16, handle 11 and wire 52 to the ground. This circuit will energize the solenoid 33 and dispose the core 35 in the position shown in Fig. 2, in which position the contacts 40 will engage a contact 57 on said core so that when the on movement is imparted to the handle 11 the necessary circuit will flow through the wire 47, contact 40, contact 57, contact 40, wire 48, controller A, wire 49, motor M and then through wire 50 to the ground. Upon off movement being imparted to the handle 11 the switch 23 will be moved into engagement with the terminal 25 and immediately a circuit will be established through the trolley 46, wire 54, solenoid 34, wire 55, terminal 25, switch 23 and then through wire 56 to the ground. This circuit will energize the solenoid 34 and move the core 35 to the position shown in Fig. 4, thus breaking the circuit through the controller A to the motor M. When the handle 11 has reached full off position the solenoid 33 will be again energized and the core 35 returned to the position shown in Fig. 2.

What is claimed is:—

1. The combination with a source of power, of a main circuit connected therewith, a controlling device in said main circuit, a normally opened secondary circuit connected with the source of power, means operated by the off movement of the controller for closing said secondary circuit, means operated by current in the secondary circuit to break the main circuit, and means operated at the termination of the off movement of the controller to close the main circuit.

2. The combination with a source of power, of a main circuit connected therewith, a controlling device in said main circuit having an on and off movement, a secondary circuit connected with the source of power and including a normally open switch, means operated by the initial off movement of the controlling device to close said switch, and means operated by the closing of the secondary circuit to break the main circuit.

3. The combination with a source of power, of a main circuit connected therewith, a controlling device in said main circuit having an on and off movement, a pair of secondary circuits connected with the source of power, one of said secondary circuits including a movable part of the controlling device and said circuit being closed in the full off position of said movable part and open in all other positions of the part, means operated by the closing of said secondary circuit to close the main circuit, the other of said secondary circuits including a normally open switch, means operated by the initial off movement of a part of the controlling device to close said switch, and means operated by the closing of the last named secondary circuit to break the main circuit.

In testimony whereof, we affix our signatures in the presence of two witnesses.

MINOT M. STEVENS.
THOMAS J. NEWCOME.

Witnesses:
THOMAS V. NEWCOME,
ALBERT DIETRICK.